(12) United States Patent
Lundy (10) Patent No.: US 11,586,237 B1
(45) Date of Patent: Feb. 21, 2023

(54) RAIL CAR HAND BRAKE SAFETY SYSTEM

(71) Applicant: Bryan K. Lundy, Republic, MO (US)

(72) Inventor: Bryan K. Lundy, Republic, MO (US)

( * ) Notice: Subject to any disclaimer, the term of this patent is extended or adjusted under 35 U.S.C. 154(b) by 1006 days.

(21) Appl. No.: 16/362,008

(22) Filed: Mar. 22, 2019

Related U.S. Application Data (60) Provisional application No. 62/646,783, filed on Mar. 22, 2018.

(51) Int. Cl.
| | |
|---|---|
| *G05G 5/00* | (2006.01) |
| *B61H 13/34* | (2006.01) |
| *E05B 67/38* | (2006.01) |
| *B61H 13/02* | (2006.01) |
| *G05G 1/04* | (2006.01) |

(52) U.S. Cl.
CPC ............ *G05G 5/005* (2013.01); *B61H 13/02* (2013.01); *B61H 13/34* (2013.01); *E05B 67/383* (2013.01); *G05G 1/04* (2013.01); *G05G 2505/00* (2013.01)

(58) Field of Classification Search
CPC ....... E05B 67/383; B61H 13/02; B61H 13/34; G05G 5/005; G05G 1/04; G05G 2505/00; Y10T 70/5717; Y10T 70/5721; Y10T 70/5726; Y10T 70/573; Y10T 70/5735; Y10T 70/5448; Y10T 70/5752; Y10T 70/5757
USPC ..................................... 70/198–207
See application file for complete search history.

(56) References Cited

U.S. PATENT DOCUMENTS

| | | | | |
|---|---|---|---|---|
| 1,100,646 A | * | 6/1914 | Barnes | B60R 25/066 70/193 |
| 1,138,795 A | * | 5/1915 | Saunders | B60R 25/005 70/193 |
| 1,140,383 A | * | 5/1915 | Leeker | B60R 25/005 70/203 |
| 1,395,966 A | * | 11/1921 | McManus | B60R 25/005 70/199 |
| 4,747,279 A | * | 5/1988 | Solow | B60R 25/0225 70/211 |
| 4,936,120 A | * | 6/1990 | Fiks | B60R 25/008 70/202 |
| 5,070,712 A | * | 12/1991 | Fox | E05B 67/003 70/49 |
| 5,141,119 A | * | 8/1992 | Milazzo | B60R 25/007 212/292 |
| 5,553,904 A | | 9/1996 | Lorenzo | |
| 5,791,175 A | * | 8/1998 | Van Wyk | B60R 25/066 70/237 |
| D439,558 S | * | 3/2001 | Potter | D12/223 |
| 6,464,269 B1 | * | 10/2002 | Wilhelm | E05B 39/00 292/307 R |
| 7,201,028 B1 | * | 4/2007 | Gogel | E05B 67/38 292/205 |
| 7,441,425 B2 | | 10/2008 | Jeong | |
| 8,066,142 B2 | | 11/2011 | Yin et al. | |

(Continued)

*Primary Examiner* — Suzanne L Barrett
(74) *Attorney, Agent, or Firm* — Cramer Patent & Design, PLLC; Aaron R. Cramer (57) ABSTRACT

A railcar safety lock incorporates a rectangular channel having an open top face and a pair of opposing open ends. An "L"-shaped bracket is pivotally secured within the channel. A pad lock aperture is secured within the channel adjacent a second open end opposite a first open end. The safety is configured to lockingly engage the bracket over a single lever railcar hand brake, thereby preventing the hand brake lever from being released.

18 Claims, 6 Drawing Sheets

(56) References Cited

U.S. PATENT DOCUMENTS

| | | | |
|---|---|---|---|
| 9,346,435 B2 * | 5/2016 | Cain | B60R 25/007 |
| D777,603 S * | 1/2017 | Lundy | D12/42 |
| 10,035,493 B1 * | 7/2018 | Lundy | B60T 7/104 |
| D865,490 S * | 11/2019 | Randolph | D8/382 |
| 2008/0010791 A1 * | 1/2008 | Huang | B60P 7/0823 |
| | | | 24/68 CD |
| 2009/0293559 A1 * | 12/2009 | Jeng | B60R 25/086 |
| | | | 70/209 |
| 2016/0215533 A1 | 7/2016 | Choi et al. | |

* cited by examiner

RAIL CAR HAND BRAKE SAFETY SYSTEM

RELATED APPLICATION

The present invention is a continuation of U.S. Provisional Application No. 62/646,783, filed Mar. 22, 2018, the entire disclosures of which are incorporated herein by reference.

FIELD OF THE INVENTION

The presently disclosed subject matter is directed to a railcar hand brake safety system.

BACKGROUND OF THE INVENTION

Railroad trains throughout the United States have provided a crucial interconnected highway between many cities and states. The safe passage of freight cars and train engines alike are a high priority for local businesses, state agencies, and federal agencies. As such, all railroad freight cars are required to have one (1) or more hand brakes attached to them on at least one (1) end of the freight car.

Hand brakes are most often set and released manually by a railroad worker, or as seen more recently such hand brakes may be remotely attended to. The current protocol is that a railroad worker must examine each hand brake before attempting to begin moving. Unfortunately, railroad hand brakes are not tamper-proof and may not be effectively monitored at night or when the staff is not currently working.

A person who gains access to a rail car may also gain access to the rail car's hand brake. This would allow a scofflaw to tamper with the hand brake and potentially take control or sabotage operations of a train. If a freight car's brake is disengaged it is possible that it may roll off or even become a runaway car. Certain embodiments of such a railcar hand brake include a single lever arm. Thus, a device that prevents manipulation of a railcar hand brake by non-railroad personnel is needed.

Various attempts have been made to solve problems found in brake locking devices art. Among these are found in: U.S. Pat. No. 8,066,142 to Yin et al.; U.S. Pat. No. 1,100,646 to Barnes; and U.S. Pat. No. 1,138,795 to Saunders. These prior art references are representative of devices providing single lever hand brake locking systems for railcars.

None of the above inventions and patents, taken either singly or in combination, is seen to describe the invention as claimed. Thus, a need exists for a reliable railroad equipment locking system, and to avoid the above-mentioned problems.

SUMMARY OF THE INVENTION

The principles of the present invention provide for a rail car hand brake safety system comprising a mounting portion which has a first mounting plate and a second mounting plate which are conjoined with a cross member. The cross member is affixed to bottom facing end of the first mounting plate and the second mounting plate and is coextensive with the length of the first mounting plate. The system also comprises a pin routing through an aligned pin aperture which is located on respectively the first mounting plate and respective the second mounting plate. The pin rotatably connects a safety brace to the mounting portion. The safety brace also includes a first section and a second section held together as a single unit. At a first end of the first section is a pivot feature that is rotatably attached to the pin such that it is independently pivotal thereon. The safety brace may be mounted to the mounting portion so that the second section extends past the second end of the second mounting plate. The system also provides for a bracket mounting slot which mounts the mounting portion to a body of a hand brake via a fastener which is routed therethrough.

The system also comprises an alignment plate which extends downward from the first section halfway between the pivot feature and a second end of the first section. The alignment plate has an alignment aperture. The alignment plate is on the same side of the first section as the second mounting plate and the second section has a first end that extends away perpendicularly from the second end of the first section. The second end of the second section has a safety brace mounting aperture that when coaligned with one of the arms mounting apertures, enables an arm extension bracket to be attached to the safety brace. The second mounting plate incorporates a padlock aperture which is located adjacent to the second end and adjacent to a bottom edge thereof. The mounting portion is attached to the hand brake in a proper location. The safety brace contacts the lever arm of the hand brake and when the lever arm is applied, the padlock aperture then aligns with the alignment aperture of the alignment plate. The co-aligned apertures are then capable of receiving a hasp of a padlock to secure the safety brace in position to prevent unauthorized manipulation of the lever arm of the hand brake.

The arm extension bracket that is capable of being removably attached to the safety brace in instances when the safety brace is not capable of contacting the lever arm. The arm extension bracket includes a pair of arm extension end portions each of which have a first end attached to a bridging arm extension center portion. A pair of arm-mounting apertures are located on the arm extension center portion typically spaced in such a way so as to be aligned with the pair of safety brace mounting apertures on the second end of the safety brace.

The mounting portion may be generally shaped as a U-shaped channel in cross-section while the first mounting plate may be shorter in length than the second mounting plate. The first mounting plate may be rectangular, metallic, and have slightly rounded corners so as to not provide a snagging point while the second mounting plate may be rectangular, metallic, and have slightly rounded corners so as to not provide a snagging point.

The cross member may be rectangular, metallic, and have slightly rounded corners so as to not provide a snagging point. The pin may be a hairpin, cotter pin or a positive locking pin. The pin may also be chamfered. The safety brace may be L-shaped and may also be rectangular, metallic, and have slightly rounded corners so as to not provide a snagging point. The pivot feature may have a width slightly less than the width of a space between the first mounting plate and the second mounting plate in order to limit lateral movement of the pivot feature on the pin.

The bracket mounting slot may be oval-shaped while the arm extension bracket may generally be a U-shaped structure. The arm extension bracket may be removably attachable to the safety brace to provide an extension when needed due to different geometries of the hand brake in an alternate in-use condition. The alignment of the arm extension mounting apertures with the safety brace mounting apertures and subsequent fastening therebetween may enable the arm extension bracket to be fastened to the safety brace. The arm extension bracket then may serve to contact the lever arm in instances when the second section of the safety brace is not capable of doing so.

A method for using a rail car hand brake safety system may comprise the following steps: first, mounting a mounting portion to a body of a hand brake via a fastener through a bracket mounting slot; second, pivoting a safety brace downward until a second section contacts a lever arm; third, aligning a padlock aperture with an alignment aperture; and fourth, passing a hasp of a padlock therethrough and subsequent locking thereof preventing unauthorized removal of the rail car hand brake safety system from the lever arm. The aforementioned method may be completed during an in-use state.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 rail car hand brake safety system
- 11 safety brace
- 12 first section
- 13 second section
- 14 safety brace mounting aperture
- 15 alignment plate
- 16 alignment aperture
- 19 mounting portion
- 20*a* first mounting plate
- 20*b* second mounting plate
- 20*c* cross member
- 21*a* first pin aperture
- 21*b* second pin aperture
- 22 padlock aperture
- 23 bracket mounting slot
- 25 arm extension bracket
- 26 arm extension mounting aperture
- 27 arm extension end portion
- 28 arm extension center portion
- 30 hand brake lever arm
- 31 hand brake
- 40 pivot feature
- 50 pin
- 51 hairpin
- 52 padlock 1. Description of the Invention The present invention is directed to a rail car hand brake safety system (herein described as the "system") 10, particularly suited for hand brakes 31 on rail cars. The exact specifications, materials used, and method of use of the system 10 may vary upon manufacturing. It is appreciated that the materials are weatherproof and waterproof and capable of withstanding repeated instances of blunt force thereon without deformation or degradation. Such materials may be metallic and covered with a protective coating. The system 10 can be selectively utilized with an arm extension bracket 25.

Figure 1:
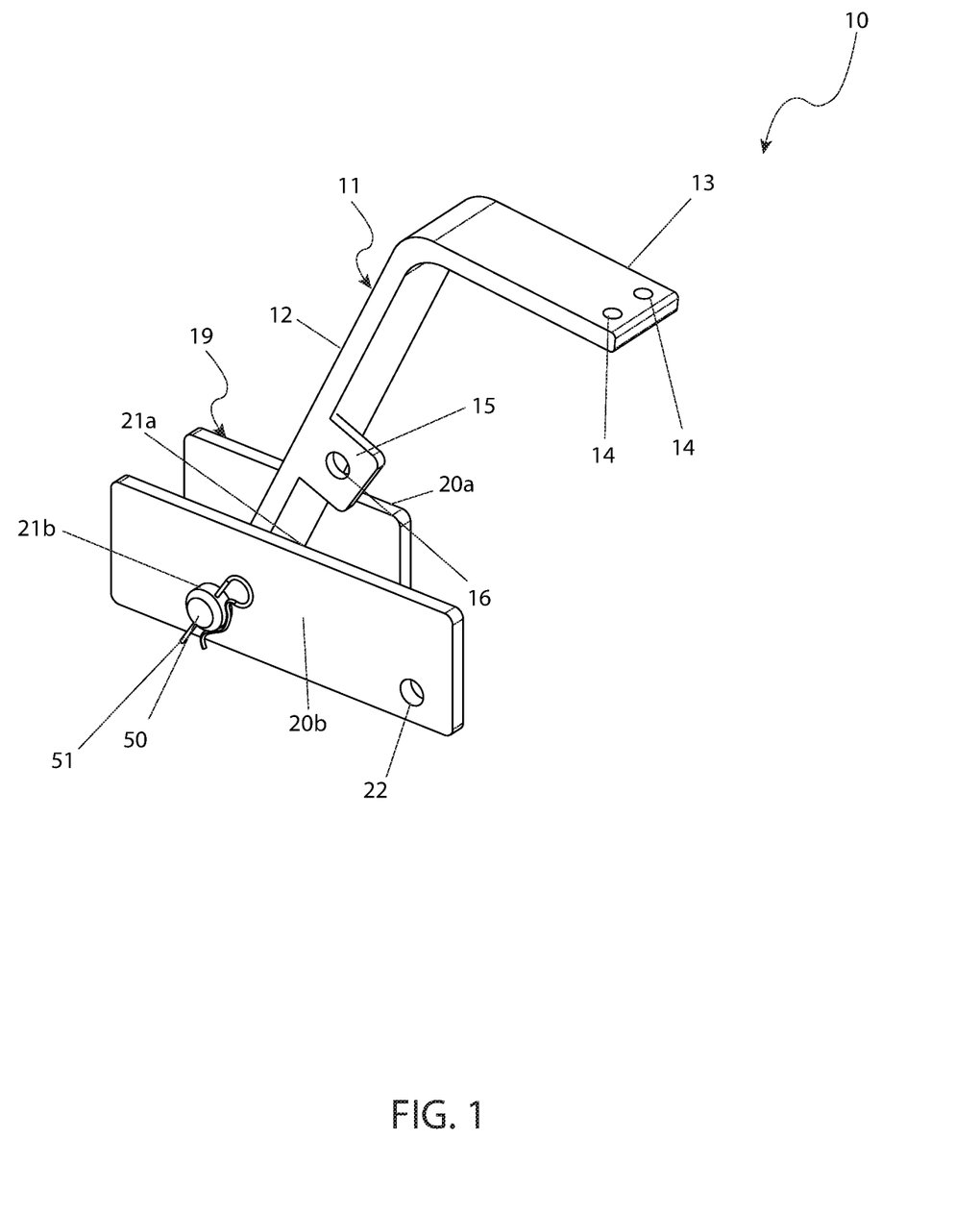
FIG. 1 is a perspective side view of a rail car hand brake safety system 10, according to a preferred embodiment of the present invention.
Figure 2:
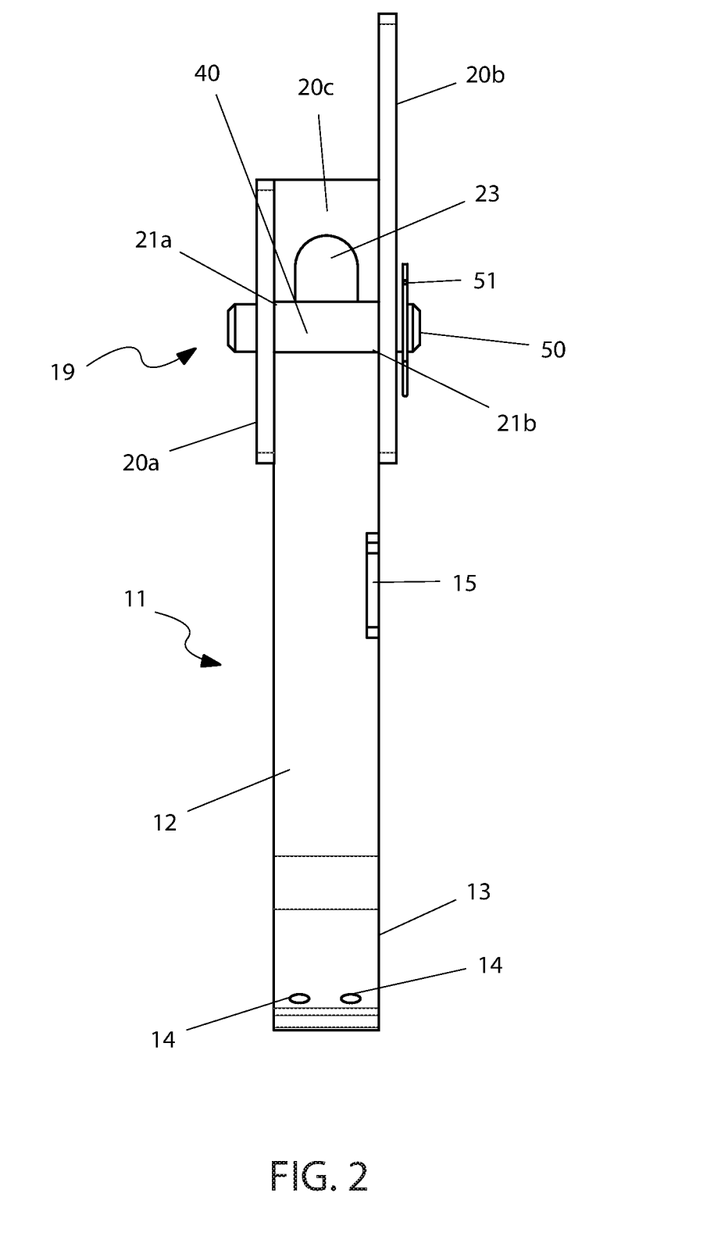
FIG. 2 is a top view of the rail car hand brake safety system 10, according to the preferred embodiment of the present invention.
Figure 3:
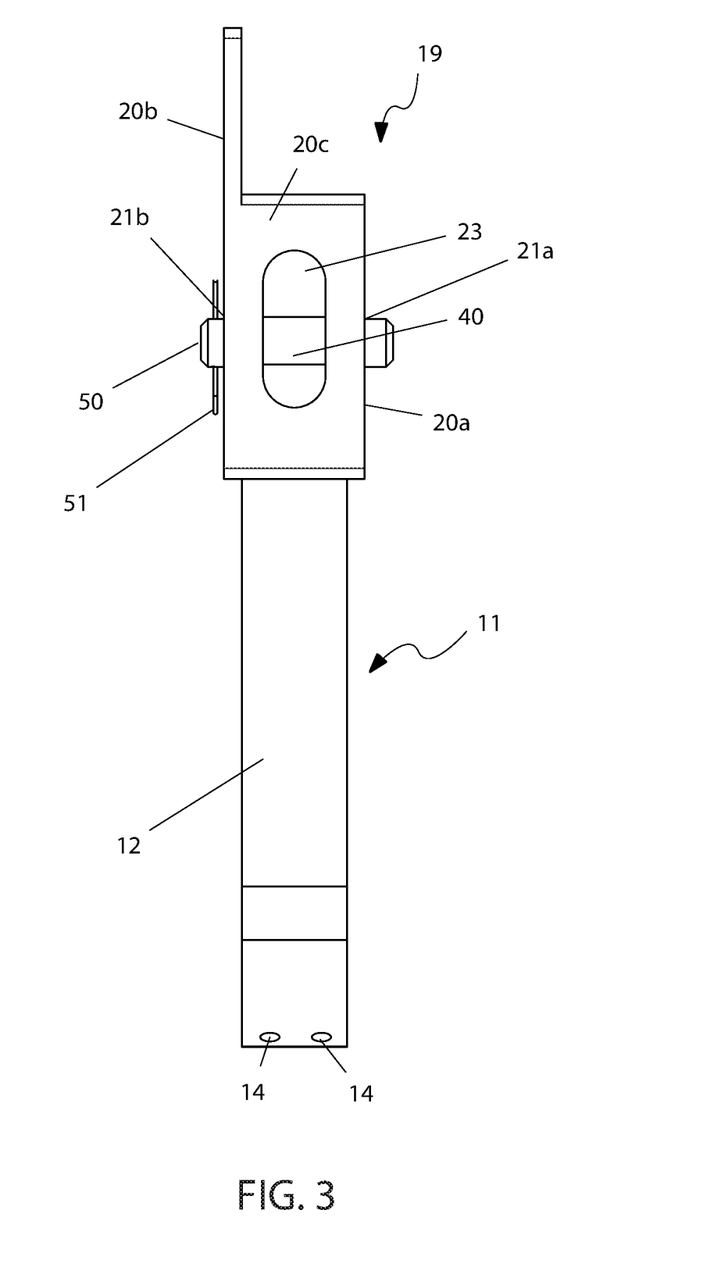
FIG. 3 is a bottom view of the rail car hand brake safety system 10, according to the preferred embodiment of the present invention.

Referring now to FIGS. 1-3, which shows a perspective view of the system 10. The system 10 incorporates a mounting portion 19 which includes a first mounting plate 20*a* and a second mounting plate 20*b* conjoined with a cross member 20*c*. The cross member 20*c* is affixed to bottom facing ends of the brackets 20*a*, 20*b* and is coextensive with the length of the first mounting plate 20*a*. As such, the mounting portion 19 is generally shaped as a "U"-shaped channel in cross-section. Preferably, the first mounting plate 20*a* is shorter in length than the second mounting plate 20*b* (i.e., the first end of the mounting plates 20*a*, 20*b* are coextensive, whereas the second end of the second mounting plate 20*b* terminates at a farther position than the first mounting plate 20*a* from the first ends thereof). In the preferred embodiment, the plates 20*a*, 20*b*, 20*c* are rectangular and metallic, and have slightly rounded corners so as to not provide a snagging point.

A pin 50 is routed through aligned pin apertures 21*a*, 21*b* located on a respective mounting plate 20*a*, 20*b* and secured with at least one (1) hairpin 51 which may be located on the pin 50 on the outer side of either the first mounting plate 20*a* or second mounting plate 20*b*. Other types of fasteners may be used, such as a cotter pin, a positive locking pin, or the like. The aligned pin apertures 21*a*, 21*b* are adjacent to the first end of the mounting plates 20*a*, 20*b*, and adjacent the bottom edge thereof. The pin 50 rotatably connects the safety brace 11 to the mounting portion 19. The pin 50 can be chamfered as is illustrated herein, or not. A bracket mounting slot 23 is oval-shaped and is capable of mounting the mounting portion 19 to a body of the hand brake 31 via a fastener routed therethrough.

The safety brace 11 includes a first section 12 and a second section 13 together as a single unit, generally in an "L"-shape. It is preferably made out of the same material as the mounting portion 19 and also has slightly rounded corners. Located at the first end of the first section 12 is a pivot feature 40 that is rotatably attached to the pin 50 as mentioned above such that it is independently pivotal thereon. Preferably, the pivot feature 40 has a width slightly less than the width of the space between the first mounting plate 20*a* and the second mounting plate 20*b* (i.e., the width of the cross member 20*c*) in order to limit the lateral movement of the pivot feature 40 on the pin 50. The safety brace 11 is mounted to the mounting portion 19 so that the second section 13 extends past the second end of the second mounting plate 20*b*.

An alignment plate 15 extends downward from the first section 12 (i.e. towards the cross member 20*c*), approximately halfway between the pivot feature 40 and the second end of the first section 12. The alignment plate 15 has an alignment aperture 16. The alignment plate 15 is on the same side of the first section 12 as the second mounting plate 20*b*. The second section 13 has a first end that extends away perpendicularly from the second end of the first section 12. This transition point is curvilinear. The second end of the second section 13 is adapted to contact the lever arm 30 of the hand brake 31. The second end of the second section 13 also has at least one (1) safety brace mounting aperture 14 that when coaligned with one (1) of the arm mounting apertures 26, enables the arm extension bracket 25 to be attached to the safety brace 11.

The second mounting plate 20*b* further incorporates a padlock aperture 22 located adjacent to the second end and adjacent to the bottom edge thereof. When the mounting portion 19 is attached to the hand brake 31 in the proper location, and the safety brace 11 (or an attached arm extension 25) contacts the lever arm 30 of the hand brake 31 when the lever arm 30 is applied, the padlock aperture 22 aligns with the alignment aperture 16 of the alignment plate 15. The co-aligned apertures 16, 22 are then capable of receiving a hasp of a padlock 52 to secure the safety brace 11 in position to prevent unauthorized manipulation of the lever arm 30 of the hand brake 31.

Figure 4:
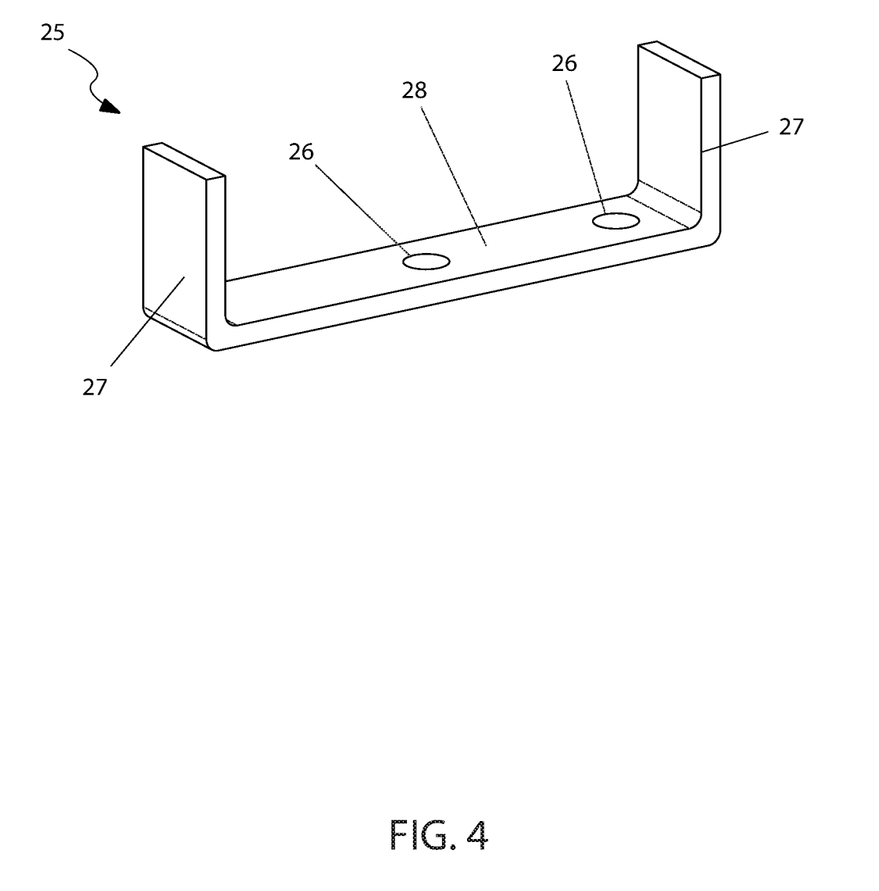
FIG. 4 is a perspective view of an arm mounting bracket 25, according to an embodiment of the present invention; and, FIG. 5*a* is an environmental view illustrating the system 10 in use on a hand brake lever arm 30 of a hand brake 31, according to a preferred method of use; and, FIG. 5*b* is an environmental view illustrating the system 10 in use on a hand brake lever arm 30 of a hand brake 31, according to an alternate method of use.

FIG. 4 illustrates an arm extension bracket 25 that is capable of being removably attached to the safety brace 11 in instances when the safety brace 11 is not capable of contacting the lever arm 21. The arm extension bracket 25 is preferably a generally "U"-shaped structure including a pair of arm extension end portions 27 each having a first end attached to a bridging arm extension center portion 28. A pair of arm mounting apertures 26 are located on the arm extension center portion 28, typically spaced in such a way so as to be aligned with the pair of safety brace mounting apertures 14 on the second end 13 of the safety brace 11.

Figure 5A:
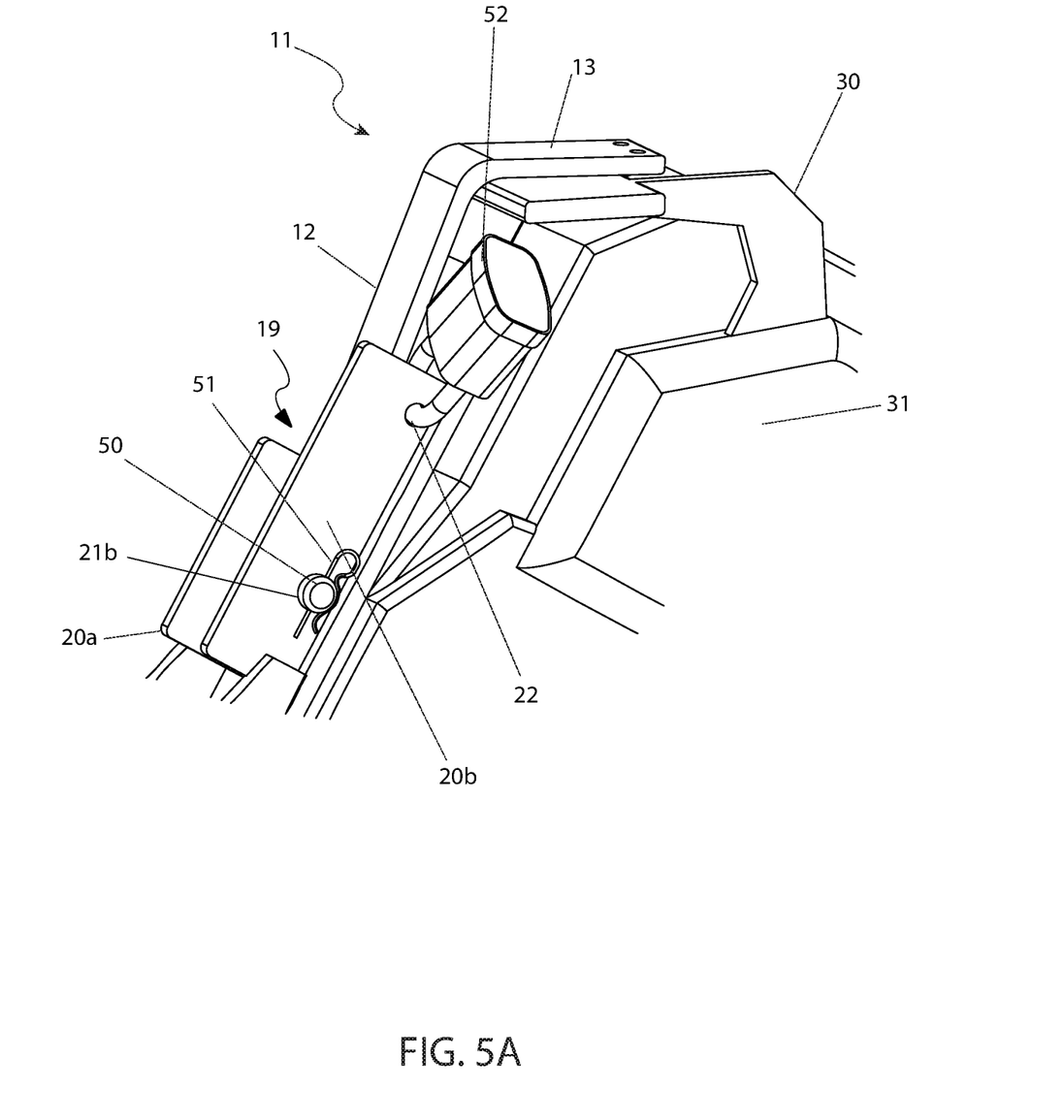

Referring now to the method of using the system 10, there is shown in FIG. 5a the system 10 during a preferred "in-use" condition. This illustrates the safety brace 11 restricting movement of the lever arm 30 of the hand brake 31 when the mounting portion 19 is attached in place on the hand brake 31. The mounting portion 19 is mounted to the body of the hand brake 31 via a fastener through the bracket mounting slot 23. The safety brace 11 is pivoted downward until the second section 13 contacts the lever arm 30. This proper positioning also results in aligning the padlock aperture 22 with the alignment aperture 16. The passing of a hasp of a padlock 50 therethrough and subsequent locking thereof prevents unauthorized removal of the system 10 from the lever arm 31.

Figure 5B:
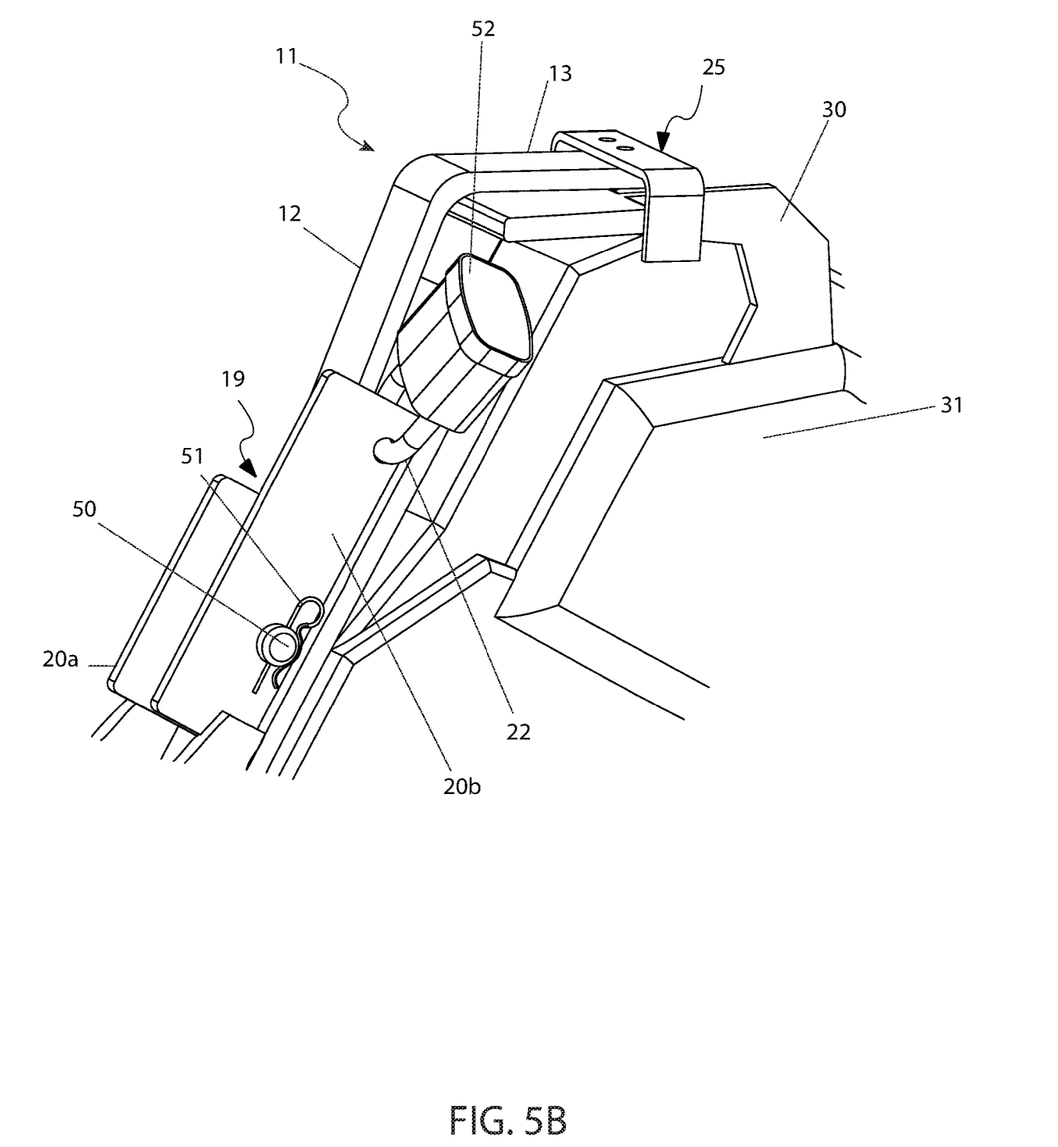

Referring to FIG. 5b, there is an arm extension 25 that is removably attachable to the safety brace 11 to provide an extension when needed due to different geometries of the hand brake 31 in an alternate "in-use" condition. Alignment of the arm extension mounting apertures 26 with the safety brace mounting apertures 14 and subsequent fastening therebetween enables the arm extension bracket 25 to be fastened to the safety brace 11. The arm extension bracket 25 then serves to contact the lever arm 31 in instances when the second section 13 of the safety brace 11 is not capable of doing so.

The invention claimed is:

1. A rail car hand brake safety system, comprising:
 a mounting portion having a first mounting plate and a second mounting plate conjoined with a cross member, said cross member is affixed to bottom facing end of said first mounting plate and said second mounting plate and is coextensive with the length of said first mounting plate;
 a pin routing through an aligned pin aperture located on respective said first mounting plate and respective said second mounting plate, said pin rotatably connects a safety brace to said mounting portion, said safety brace includes a first section and a second section held together as a single unit, at a first end of said first section is a pivot feature that is rotatably attached to said pin such that it said pin is independently pivotal thereon, said safety brace is mounted to said mounting portion so that said second section extends past said second end of said second mounting plate;
 a bracket mounting slot mounting said mounting portion to a body of a hand brake via a fastener routed therethrough; and
 an alignment plate extending downward from said first section halfway between said pivot feature and a second end of said first section, said alignment plate having an alignment aperture, said alignment plate is on the same side of said first section as said second mounting plate and said second section has a first end that extends away perpendicularly from said second end of said first section, said second end of said second section has a safety brace mounting aperture that when coaligned with one of an arm mounting apertures, enables an arm extension bracket to be attached to said safety brace, said second mounting plate incorporates a padlock aperture located adjacent to said second end and adjacent to a bottom edge thereof, said mounting portion is attached to said hand brake, said safety brace contacts said lever arm of said hand brake and when said lever arm is applied, said padlock aperture aligns with said alignment aperture of said alignment plate, said co-aligned apertures are then capable of receiving a hasp of a padlock to secure said safety brace in position to prevent unauthorized manipulation of said lever arm of said hand brake, said arm extension bracket that is capable of being removably attached to the safety brace in instances when said safety brace is not capable of contacting said lever arm, said arm extension bracket includes a pair of arm extension end portions each having a first end attached to a bridging arm extension center portion, a pair of arm mounting apertures are located on said arm extension center portion typically spaced so as to be aligned with said pair of safety brace mounting apertures on said second end of said safety brace.

2. The rail car hand brake safety system according to claim 1, wherein said mounting portion is generally shaped as a U-shaped channel in cross-section.

3. The rail car hand brake safety system according to claim 1, wherein said first mounting plate is shorter in length than said second mounting plate.

4. The rail car hand brake safety system according to claim 1, wherein said first mounting plate is rectangular, metallic, and have slightly rounded corners so as to not provide a snagging point.

5. The rail car hand brake safety system according to claim 1, wherein said second mounting plate is rectangular, metallic, and have slightly rounded corners so as to not provide a snagging point.

6. The rail car hand brake safety system according to claim 1, wherein said cross member is rectangular, metallic, and have slightly rounded corners so as to not provide a snagging point.

7. The rail car hand brake safety system according to claim 1, wherein said pin is a hairpin.

8. The rail car hand brake safety system according to claim 1, wherein said pin is a cotter pin.

9. The rail car hand brake safety system according to claim 1, wherein said pin is a positive locking pin.

10. The rail car hand brake safety system according to claim 1, wherein said pin is chamfered.

11. The rail car hand brake safety system according to claim 1, wherein said safety brace is L-shaped.

12. The rail car hand brake safety system according to claim 1, wherein said safety brace is rectangular, metallic, and have slightly rounded corners so as to not provide a snagging point.

13. The rail car hand brake safety system according to claim 1, wherein said pivot feature has a width slightly less than the width of a space between said first mounting plate and said second mounting plate in order to limit lateral movement of said pivot feature on said pin.

14. The rail car hand brake safety system according to claim 1, wherein said bracket mounting slot is oval-shaped.

15. The rail car hand brake safety system according to claim 1, wherein said arm extension bracket is a generally U-shaped structure.

16. The rail car hand brake safety system according to claim 1, wherein said arm extension bracket is removably attachable to said safety brace to provide an extension when needed due to different geometries of said hand brake in an alternate in-use condition.

17. The rail car hand brake safety system according to claim 1, wherein alignment of said arm extension mounting apertures with said safety brace mounting apertures and subsequent fastening therebetween enables said arm extension bracket to be fastened to said safety brace.

18. The rail car hand brake safety system according to claim 17, wherein said arm extension bracket then serves to contact said lever arm in instances when said second section of said safety brace is not capable of doing so.

\* \* \* \* \*